United States Patent

Cristie

[15] 3,650,363
[45] Mar. 21, 1972

[54] BICYCLE CLUTCH AND PARTS ASSOCIATED THEREWITH

[72] Inventor: Martin Cristie, Brooklyn, N.Y.
[73] Assignee: Stelber Industries Inc., Brooklyn, N.Y.
[22] Filed: Mar. 24, 1970
[21] Appl. No.: 23,082

[52] U.S. Cl.................................192/64, 192/6, 192/13
[51] Int. Cl..................................................F16d 23/00
[58] Field of Search.........................................192/64, 42, 6

[56] References Cited

UNITED STATES PATENTS

| | | | |
|---|---|---|---|
| 2,489,934 | 11/1949 | Schwinn | 192/64 |
| 2,510,032 | 5/1950 | Hood | 192/6 |

Primary Examiner—Mark M. Newman
Assistant Examiner—Randall Heald
Attorney—Robert I. Pearlman

[57] ABSTRACT

A bicycle in which a drive wheel is driven through a pedal-operated drive. A clutch is provided for transmitting the drive to the bicycle drive wheel, and this clutch is constructed so that it will respond only to operation of the drive in the direction which will propel the bicycle forwardly for assuming an engaged position to transmit motion to the drive wheel. Under any other conditions such as when the drive is operated in a reverse direction or when the drive is stationary the drive wheel is free to turn either in a forward or in reverse direction so that, for example, it is possible to freely roll the bicycle rearwardly when the drive is not operating or is operated in a reverse direction. This reverse direction can occur when the pedals are turned rearwardly, and a brake structure brakes the movement of the bicycle in response to such rearward turning of the bicycle pedals.

4 Claims, 4 Drawing Figures

INVENTOR.
MARTIN CRISTIE

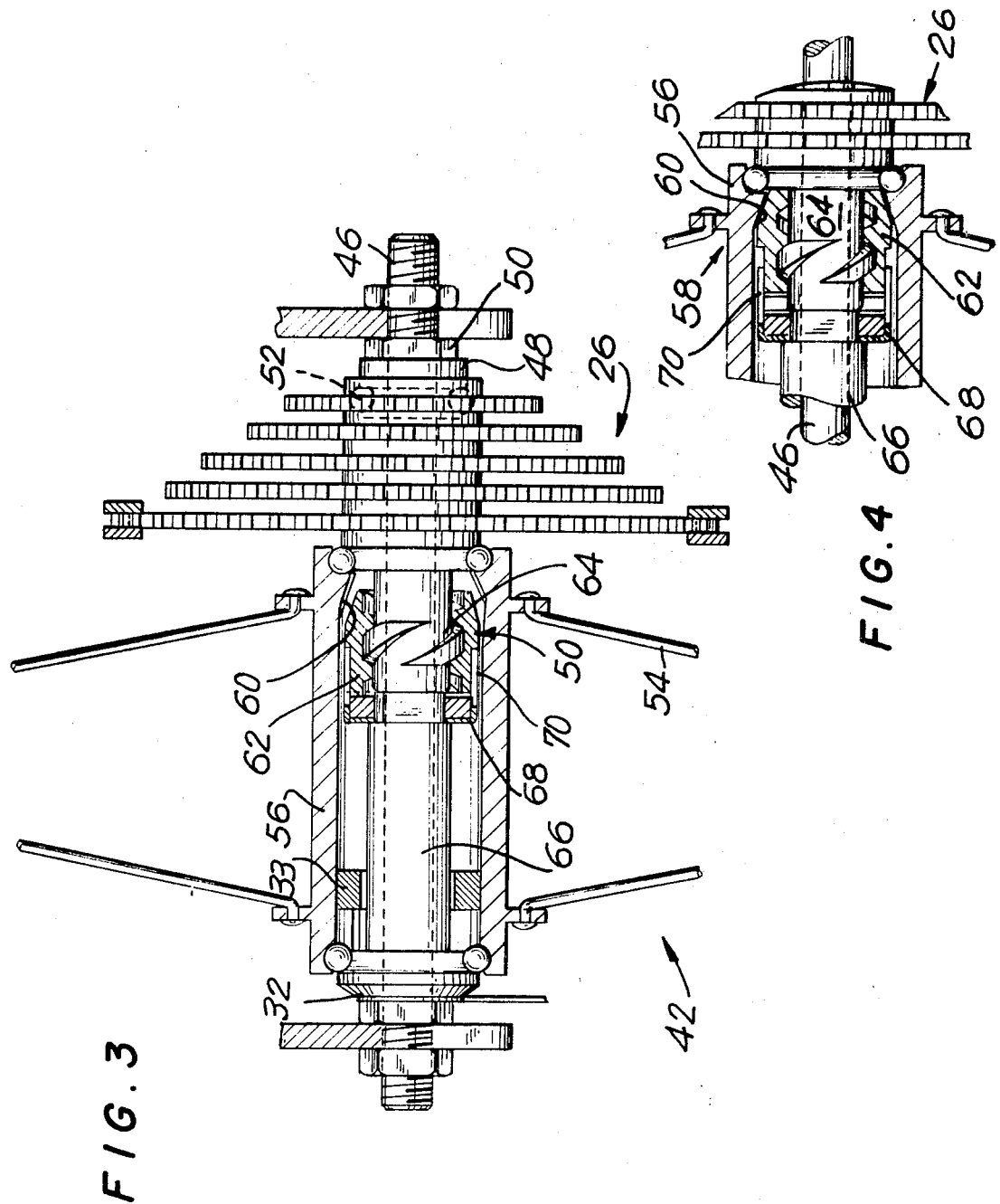

BICYCLE CLUTCH AND PARTS ASSOCIATED THEREWITH

BACKGROUND OF THE INVENTION

The present invention relates to bicycles.

In particular, the present invention relates to bicycles which have multi-speed drives for propelling the bicycle at a selected speed in response to rotation of the pedals thereof, such drives generally being of the chain derailer type.

While bicycles of this latter general type are highly desirable because of the range of speeds which can be achieved, such bicycles suffer from serious drawbacks. Thus, any rearward movement of the bicycle which tends to drive the transmission in reverse results in derailment. Therefore care must be exercised in rolling the bicycle rearwardly. However, of even greater significance is the fact that with such bicycles it is not possible to provide conventional brakes actuated upon reverse turning of the pedals. With bicycles of this type such reverse turning of the pedals would also result in derailment, and therefore it is essential to use with bicycles of this type hand-operated brakes. This necessity of using hand brakes with this type of multi-speed bicycle is an extremely serious drawback because of the added cost involved in the use of such brakes and because of the care which must be exercised by the operator in avoiding a reverse rotary movement of the pedals.

SUMMARY OF THE INVENTION

It is accordingly a primary object of the present invention to provide a multi-speed bicycle of the above general type which will avoid the above drawbacks.

More specifically, it is an object of the invention to provide a multi-speed bicycle of this type which can accommodate a brake system which can respond to rotary movement of the pedals in a reverse direction for braking the bicycle.

In addition, it is an object of the present invention to provide a construction of the above type which will permit a bicycle to be rolled rearwardly without any problems.

In addition, it is an object of the invention to provide a bicycle structure which is simple and rugged so as to be capable of achieving the above objects at a relatively low cost, while maintaining all components in good operating condition with relatively little maintenance.

According to the invention the drive wheel of the bicycle is propelled forwardly by way of transmission of motion thereto through a clutch means which coacts on the one hand with the drive wheel and on the one hand with the drive means which drives the drive wheel. This clutch means of the invention will automatically assume an engaged position when the drive means is operated in a direction which will rotate the drive wheel in a given direction of rotation which will propel the bicycle forwardly. However, when the drive means is operated in a reverse direction, which would tend to rotate the drive wheel in a direction opposite to the given direction which propels the bicycle forwardly, the clutch means automatically assumes a disengaged position preventing transmission of motion to the drive wheel, so that at this time the drive wheel can rotate freely in either direction, and it becomes possible to actuate a brake means from a pedal assembly by turning the latter in a direction which is the reverse of the direction used for forward bicycle movement.

BRIEF DESCRIPTION OF DRAWINGS

The invention is illustrated by way of example in the accompanying drawings which form part of this application and in which:

FIG. 3 is a transverse sectional elevation of the rear drive wheel of the bicycle, take in a plane which contains the axis of the rear wheel, and showing one possible embodiment of a clutch means of the invention, the clutch means being shown in FIG. 3 in its disengaged position; and FIG. 4 is a fragmentary sectional elevation showing the clutch structure of FIG. 3 in its engaged position.

DESCRIPTION OF PREFERRED EMBODIMENTS
PREFERRED EMBODIMENTS

Figure 1:
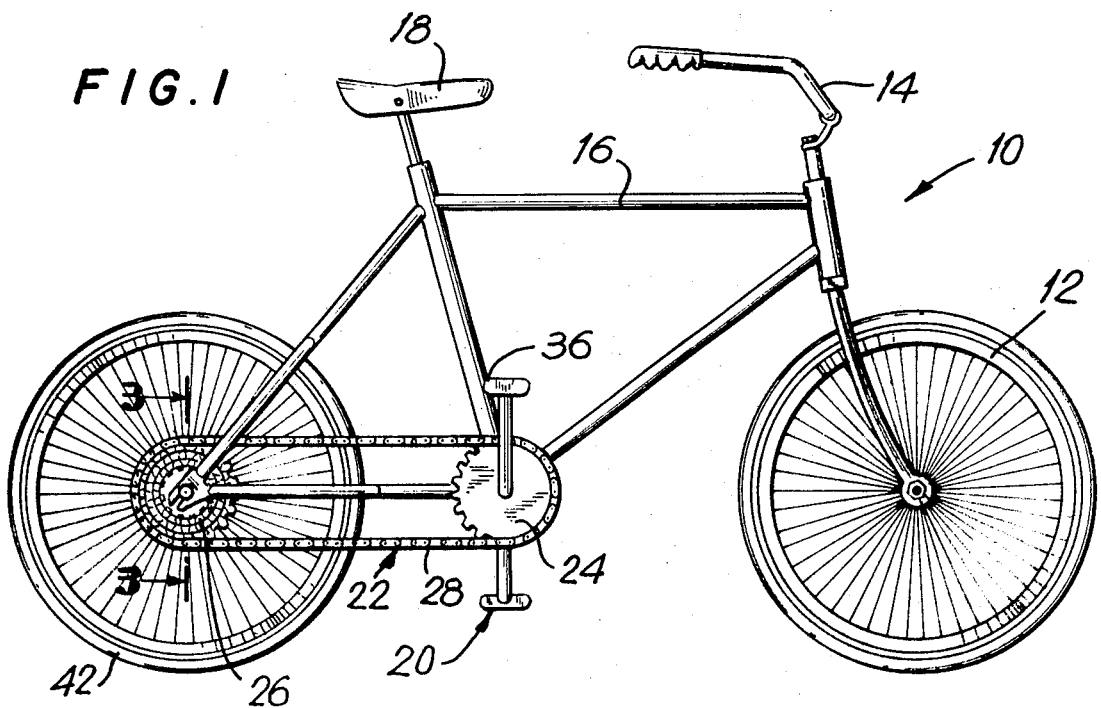
FIG. 1 is a simplified, schematic side elevation of a bicycle provided with the structure of the invention.

Referring now to the drawings, there is shown in FIG. 1 a bicycle 10 having the usual front wheel 12 supported for free rotary movement and serving to steer the bicycle by turning of the handle bars 14. The bicycle has the usual frame 16 and seat 18. The frame supports for rotary movement the pedal assembly 20 which forms part of a drive means 22. This drive means 22 includes an assembly 24 of sprocket wheels of different diameters connected to the pedal assembly 20 of the drive means 22 for rotary movement with the pedal assembly. The drive means further includes a rear assembly 26 of sprocket wheels of different diameters supported for rotary movement in a manner described in greater detail below in connection with FIG. 3 and connected with the assembly 24 by a sprocket chain 28, so that in this way in response to turning of the pedal assembly 20 of the drive means by the operator the drive means will be operated in a forward or reverse direction which will result in rotation of the sprocket assembly 26 in a clockwise or counterclockwise direction, respectively, as viewed in FIG. 1. As is well known the operator can selectively place the chain 28 in engagement with selected sprockets of the assemblies 24 and 26 for achieving a desired transmission ratio.

According to one of the features of the invention it is possible with a drive of this type to operate a brake means in response to the turning of the pedal assembly 20 in a reverse direction, which would be a counterclockwise direction, as viewed in FIG. 1. The brake means can take any desired form which will respond to reverse turning of the pedal assembly.

Referring to FIG. 3, it will be seen that the rear sprocket assembly 26 of the drive means 22 is supported for free rotary movement on a stationary axle 46 fixedly carried by the frame 16 in a well known manner. The axle carries a bearing cone 48 and lock nut 50 for maintaining ball bearings 52 in engagement with the right end of the sprocket assembly 26, as viewed in FIG. 3, to contribute to the support of the sprocket assembly for free rotary movement.

The drive wheel 42 which is fragmentarily illustrated in FIG. 3 includes the spokes 54 which are connected at their inner ends to and radiate from a tubular sleeve 56 which is situated at the hub of the drive wheel 42 and which has an axis coinciding with the axis of the axle 46. This tubular sleeve 56 coacts at its opposite ends with ball bearing assemblies maintained in position on the axle so that the drive wheel is freely rotatable. The sleeve 56 surrounds and accommodates in its interior a clutch means 58 which forms part of the combination of the invention, and this clutch means is formed in part by an inner, annular tapered surface 60 of the sleeve 56.

The clutch means 58 includes a clutch cone 62 which is movable axially along the interior of the sleeve 56, this clutch cone itself being supported for free rotary and axial movement by the axle 46. The shiftable clutch cone 62 is formed with an interior thread for receiving the exterior threads of a rotary screw 64 which is fixed to the sprocket assembly 26 for rotary movement therewith. The clutch means 58 is shown in FIG. 3 in its disengaged position where all of the threads of the screw 64 extend to the right, as viewed in FIG. 3, beyond the cone 62, remaining only in engagement with the right end surface of the cone 62, while FIG. 3 shows in dotted lines the interior threads within the cone 62.

In the interior left region of the sleeve 56, as viewed in FIG. 3, the axle 46 fixedly carries a stationary tube through which the axle extend, this stationary tube being fixed to the stationary axle and carrying the inner race of the left ball bearing assembly, as viewed in FIG. 3. The stationary tube 66 terminates at its right end in a noncircular portion of rectangular configuration, for example, received in mating opening in a left end wall of a springy ring or cylinder 68 forming a transfer spring. This ring or cylinder 68 has a plurality of springy fingers 70 projecting into overlapping relationship with the exterior cylindrical surface portion of the shiftable clutch cone 62 at the region of the latter distant from its tapered surface which is to engage the tapered surface 60 at the interior of the sleeve 56. These springy fingers of the transfer spring 68 tend to displace the clutch cone 62 to the right, as viewed in FIG. 3.

In the disengaged position of the clutch which is shown in FIG. 3, the rotary screw 64 can simply rotate with the sprocket assembly 26 in a direction opposite to that direction which will propel the drive wheel 42 forwardly, and the left ends of the threads of the screw 64 will simply ride along the right end surface of the clutch cone 62, as viewed in FIG. 3. However, the moment that the pedals are turned in a clockwise direction, as viewed in FIG. 1, so that the drive means is operated in that direction which will propel the bicycle forwardly, the direction of rotation of the sprocket assembly 26 becomes that direction which corresponds to clockwise turning of the drive wheel 42 as viewed in FIG. 1, or in other words to the direction or rotation of the drive wheel 42 which will propel the bicycle forwardly. As soon as the sprocket assembly 26 rotates in this particular direction, the screw 64, which cannot move axially along the axle 46, has its threads engaging the internal threads of the clutch cone 62 to displace the latter positively to the right, as viewed in FIG. 3, thus placing the clutch means 58 in its engaged position where the clutch cone presses at its front tapered surface against the corresponding tapered surface in the interior of the sleeve 56 and thus the rotary motion in the forward direction is automatically transmitted to the drive wheel by automatic engagement of the clutch means 58 in response to rotation of the drive means in the direction which will produce forward propulsion of the bicycle. The clutch means 58 is shown in its engaged position in FIG. 4, and it will be noted that the clutch cone 62 has been displaced to the right beyond the position shown in FIG. 3 with respect to the transfer spring 68, the springy fingers 70 of which maintain the clutch cone at all times in a position to coact with the threads of the screw 64 to be displaced to the engaged position of FIG. 4.

Assuming that any instant the operator for some reason stops turning the pedal assembly 20 so that the latter remains stationary, then even a continued forward rotary movement of the drive wheel 42 for a short period of time will provide the equivalent of reverse turning of the sprocket assembly 26 with respect to the drive wheel, so that the engagement between the sleeve 46 and the clutch cone 62 will result in rotary movement of the latter with respect to the screw in a direction which will displace the cone 62 to the left from the position of FIG. 4 toward the position of FIG. 3 to a disengaged position. Therefore, when the operator for any reason stops turning the pedal assembly 20 the clutch immediately becomes disengaged and the drive wheel is completely cut off from any influence from the drive means until the latter is again operated in that direction which will propel the bicycle forwardly.

In addition, when the operator positively rotates the pedals 20 in a reverse direction to apply the brake means 34, the reverse rotary movement of the sprocket assembly 26 through even a small angle will result in displacement of the clutch means to its disengaged position. As long as the clutch means remains in its disengaged position the drive wheel 42 can freely turn either forwardly or rearwardly since it is completely beyond the influence of the drive means 22.

Figure 2:
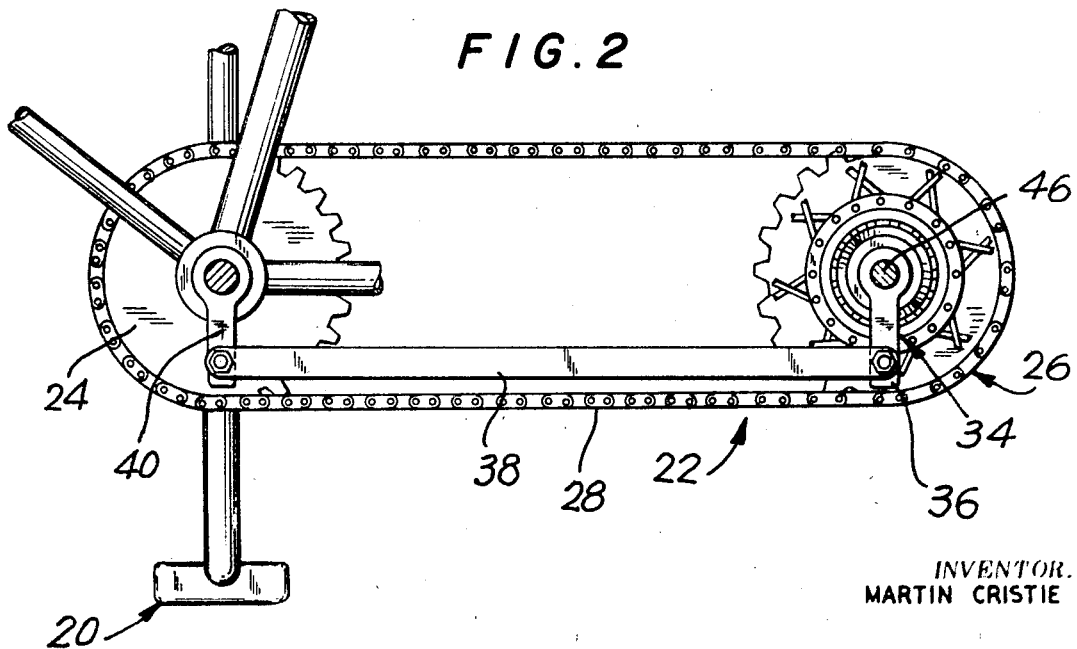
FIG. 2 is a schematic partly sectional representation of the brake system of FIG. 1.

Referring to FIG. 2, it will be seen that the left bearing member 32 of FIG. 3 has a crank arm 36 depending therefrom and connected through a rod 38 to a second crank arm 40 which is connected through a one-way drive to the rotary pedal assembly 20. When the pedal assembly 20 turns in a counterclockwise direction, as viewed in FiG. 2, the one-way clutch prevents any drive from being transmitted to the crank 40. However, when the pedal assembly 20 of FIG. 2 is turned in a clockwise direction, as viewed in FIG. 2, the drive is transmitted through the one-way clutch, which is of a well known construction, to the arm 40 so that the rod 38 is pulled to the left, as viewed in FIG. 2, thus acting through the arm 36 to turn the bearing member 32 in a clockwise direction as viewed in FIG. 2.

In the particular example illustrated schematically in FIG. 3, the rotary bearing member 32 is operatively connected with a circular brake band 33 capable of being expanded and pressed against the inner surface of the sleeve 56 to apply the braking force and capable of being retracted inwardly away from the inner surface of the sleeve 56 to eliminate the braking force. The connection between member 32 and brake band 33 is only schematically indicated in FIG. 3. The member 32 is operatively connected with an expander-type of brake means which includes the brake band 33, member 32 being connected to a spreader cam situated between the ends of the brake band to press the latter against the inner surface of the rotary hub 56 when the brake means 34 is applied, and of course releasing the brake means when the bicycle is propelled forwardly. It is emphasized that this is but one of many different types of braking systems available to respond to reverse rotation of the pedal assembly 20 for braking the bicycle.

Thus, with this construction the operator can at any time provide a force tending to rotate the pedal assembly 20 in a reverse direction, with the result that the transmission of motion to the drive wheel is automatically terminated simultaneously with actuation of the brake means to stop the movement of the bicycle. Thus, it is not necessary with the structure of the invention to use hand brakes.

What is claimed is:

1. In a multi-speed bicycle of the chain derailer type:
   1. a drive wheel for propelling the bicycle forwardly when said drive wheel rotates in a given direction;
   2. multi-speed drive means of the chain derailler type for driving said drive wheel, said drive means including a rotary pedal assembly actuated by the operator and operating said multi-speed drive means in the direction for transmitting motion to said drive wheel for propelling the bicycle forwardly when the operator turns the pedal assembly in a forward direction;
   3. clutch means coacting with said multi-speed drive means and wheel for transmitting or interrupting the transmission of motion from said drive means to said drive wheel, said clutch means responding automatically to operation of said drive means in a direction which will drive said wheel in said given direction of rotation for propelling the bicycle forwardly to assume an engaged position for transmitting motion from said multi-speed derailler type drive means to said drive wheel, and said clutch means also responding automatically to operation of said drive means in a direction which would rotate said drive wheel in a direction opposite to said given direction as well as to lack of operation of said drive means, when the latter is stationary, for automatically assuming a disengaged position where no motion will be transmitted from said multi-speed derailler type drive means to said drive wheel, so that when said multi-speed derailler type drive means is either stationary or would drive the drive wheel in a direction opposite to said given direction, the drive wheel is completely cut off from influence by said drive means and can freely rotate in either direction; and
   4. brake means coacting with said wheel and pedal assembly of said drive means for braking rotation of said wheel when said pedal assembly is turned in a reverse direction while releasing said wheel when said pedal assembly is rotated by the operator in a forward direction, said brake means being actuated solely by the reverse motion of the pedal assembly and operating independently of the clutch means, drive means and the movement of the drive wheel other than to apply braking thereto.

2. The combination of claim 1 and wherein said drive wheel includes, at its hub, a sleeve surrounding said clutch means and having an inner tapered surface portion which forms part of said clutch means, said clutch means including in the interior of said sleeve a clutch cone movable axially along said sleeve for engagement with or separation from said tapered inner surface of said sleeve, and screw means driven by said drive means for urging said cone into engagement with said tapered sleeve surface when said drive means operates in a direction which will rotate said drive wheel in said given direction and for displacing said cone away from said tapered inner surface of said sleeve when said drive means operates in a direction which would tend to rotate said drive wheel in a direction opposite to said given direction or when said drive means and screw means are stationary and said sleeve turns in either direction.

3. The combination of claim 1 and wherein said multi-speed drive means includes a plurality of sprockets of different diameters coaxial with said drive wheel and a plurality of sprockets of different diameters coaxial with said pedal assembly, selected sprockets of each of said plurality of sprockets being interconnected by a chain transmission.

4. The combination of claim 1 and wherein said drive wheel has at its hub a tubular sleeve housing said clutch means in its interior and having an inner tapered surface forming part of said clutch means, said clutch means including a cone axially movable along said sleeve into and out of engagement with said tapered surface and a rotary screw operatively connected to said drive means to be rotated thereby and coacting with said cone for displacing the latter into a position engaging said tapered surface, for engaging said clutch means, when the said drive means is operated in a direction which will propel the bicycle forwardly while said screw coacts with said cone to displace the latter away from said tapered surface to place the clutch means in its disengaged position when said drive means is operated in a direction which would tend to rotate said drive wheel in a direction opposite to said given direction or when said drive means is stationary, so that when said pedal assembly is turned by the operator in the reverse direction for actuating said brake means the clutch means is automatically disengaged.

* * * * *